2,867,610
POLYMERS AND COPOLYMERS OF DIALKENYL BETA-(CARBOXYALKYL) ALKANEPHOSPHONATES

Arthur Dock Fon Toy and Robert S. Cooper, Park Forest, Ill., assignors to Victor Chemical Works, a corporation of Illinois No Drawing. Application September 22, 1953
Serial No. 381,764

10 Claims. (Cl. 260—78.5)

This invention relates to polymers and copolymers of dialkenyl beta-(carboxyalkyl) alkane phosphonates.

We have found that dialkenyl phosphites in the presence of sodium alkenolates will react by addition with alkyl esters of ethylenically unsaturated carboxylic acids to give a new series of dialkenyl phosphonate esters. Such esters have been found to be polymerizable to hard, glassy, solid resins having self-flame-extinguishing characteristics and other valuable properties.

The dialkenyl phosphites which we have found suitable for our purpose are the diallyl and dimethallyl esters as represented by the formula:

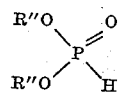

where R″ is a beta, gamma, unsaturated radical of the formula:

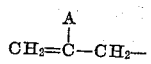

where A is hydrogen or a methyl radical.

The alkyl esters of ethylenically unsaturated carboxylic acids which may be employed are illustrated by the formula:

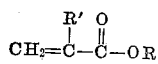

where R′ represents hydrogen or methyl radicals, and R represents an alkyl group selected from methyl and ethyl radicals. Esters meeting this designation are methyl methacrylate, ethyl methacrylate, methyl acrylate and ethyl acrylate.

The new compounds of this invention may be prepared by reacting the dialkyenyl phosphite with the ethylenically unsaturated carboxylic acid ester in accordance with the equation

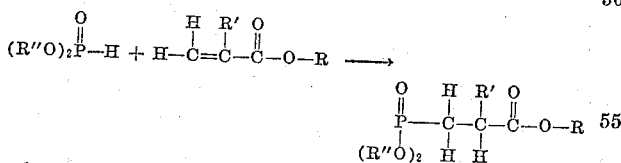

where R, R′ and R″ are as above described.

The reaction products are clear, slightly viscous liquids which may be used for coating and flameproofing wood, fabrics, etc. They may also be polymerized in the presence of organic peroxides to give useful resin products ranging in character from viscous gels to hard glass-like solids having self-extinguishing flame characteristics.

The reaction products also may be copolymerized with a number of polymerizable ester compounds such as methyl methacrylate, vinyl acetate, diallyl phthalate, unsaturated polyesters or alkyd resins, styrene, etc., to give hard, solid products having excellent physical properties and self-extinguishing flame characteristics.

The preparation and properties of a few typical new compounds are illustrated in the following examples.

EXAMPLE 1

*Preparation of diallyl beta-carboxymethyl propanephosphonate*

324 grams (2.0 moles) of diallyl phosphite, 200 grams (2.0 moles) of methyl methacrylate, and 5.0 grams hydroquinone were placed in a one liter flask, and a catalyst solution, made up of 17.6 grams of sodium dissolved in 214 grams of allyl alcohol and 220 grams of benzene, was added dropwise while maintaining a reaction temperature between 15° and 30° C. by use of an ice-bath. 160 grams of the sodium (catalyst) solution were used over a period of 100 minutes. After the reaction was complete, the mixture was neutralized with 14 ml. of 3.7% hydrochloric acid. The volatile components were distilled off and a small amount of copper resinate added to the residual product. The product was then distilled, yielding 257.1 grams of a light amber colored liquid. On redistillation, the product was a substantially water-white liquid having a boiling point of 113–122° C. at ½ mm. Hg pressure.

On heating the liquid diallyl beta-carboxymethyl propanephosphonate product at 85° C. with 3% benzoyl peroxide for 16 hours, a self-extinguishing solid resin was obtained.

EXAMPLE 2

Diallyl, beta-carboxymethyl propanephosphonate was prepared in accordance with the equation

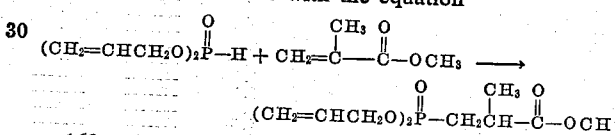

162 g. (1.0 mole) of redistilled diallyl phosphite, 100 g. (1.0 mole) of methyl methacrylate (containing 0.006% hydroquinone) and 0.5 g. of trinitrobenzene (as polymerization inhibitor) were placed in a 500 ml. flask fitted with stirrer, thermometer and dropping funnel.

A catalyst solution, made up of sodium allylate in allyl alcohol and containing 2.8% sodium, was placed in the dropping funnel and added dropwise to the mixture in the flask. The reaction temperature was maintained at 30–40° C. by the addition of catalyst solution or cooling with cold water. The reaction was completed in 160 minutes, after use of 43.5 g. of the catalyst solution (0.053 mole of Na). 5 ml. of water were added and the reaction mixture saturated with $CO_2$. The volatiles were stripped off to 100° C. at 5 mm. pressure and the product distilled. 236.7 g. (90.5% yield) of the product were recovered at 118–133° C. and 1 mm. pressure. This product was redistilled into two fractions. The first fraction (107.3 g.) boiling at 109–112° C. at 1 mm. pressure had an index of refraction $N_D^{25}=1.4554$ and a phosphorus content of 12.1% compared to the 11.8% theoretical content. The second fraction (125.4 g.) boiling at 112° C. at 1 mm. had a phosphorus content of 11.7% and a refractive index $N_D^{25}=1.4579$.

Both fractions polymerized with 3% benzoyl peroxide at 82° C. for 16 hours forming solid resin products, the second fraction yielding a more highly satisfactory hard, tough, clear, colorless resin. The product had excellent self-flame-extinguishing character.

EXAMPLE 3

Diallyl, beta-carboxymethyl ethanephosphonate was prepared following the same procedure as in Example 2, except that methyl acrylate was used instead of methyl methacrylate and the reaction temperature was not over 26° C. A redistilled product yield of 90.7% was obtained. The product boiled at 105–110° C. at ½ mm. pressure, and had an index of refraction $N_D^{25}=1.4578$.

On polymerization with 3% benzoylperoxide at 82° C. for 16 hours, a hard, fairly tough, self-extinguishing resin was obtained.

EXAMPLE 4

The monomeric diallyl beta-carboxymethyl ethanephosphonate of Example 3 was copolymerized with methyl methacrylate in various proportions to yield excellent, hard, tough resin products. Mixtures of the monomeric esters were copolymerized in the presence of small amounts of benzoyl peroxide by heating for two hours at 70° C. and 16 hours at 85° C. The copolymers containing 20% or more by volume of the diallyl beta-carboxymethyl ethanephosphonate were self-extinguishing, hard, tough, clear, solid resins.

Similar hard, tough, self-extinguishing resins were obtained when copolymerizing the product with Laminac No. 4201, an unsaturated polyester-type partial polymer produced by American Cyanamid Co.

Process conditions in the preparation of diallyl beta-carboxymethyl propanephosphonate may be varied without undue effect on the yield and character of the product. For example, the reaction was carried out with and without the use of a polymerization inhibitor, with temperatures up to 80° C. and varying amounts of sodium catalyst, while obtaining yields of better than 90% of products which were polymerizable to satisfactory hard, tough, self-extinguishing resins.

EXAMPLE 6

Diallyl beta-carboxymethyl propanephosphonate was copolymerized with methyl methacrylate, diallyl phthalate and Laminac 4201, by heating mixtures of the monomers in proportions shown in the following table, for about 16 hours at 85–87° C. with varying amounts of benzoyl peroxide. Results of these tests are shown in the following table:

TABLE I

| Diallyl betacarboxymethyl propanephosphonate, gm. | Methyl methacrylate, gm. | Diallyl phthalate, gm. | Unsaturated polyester (Laminac 4201), gm. | Benzoyl peroxide, gm. | Copolymer resin characteristics |
|---|---|---|---|---|---|
| 1.0 | 9.0 | ------ | ------ | 0.005 | Hard, tough, clear solid. |
| 1.5 | 8.5 | ------ | ------ | 0.006 | Do. |
| 2.0 | 8.0 | ------ | ------ | 0.008 | Do. |
| 2.5 | 7.5 | ------ | ------ | 0.014 | Hard, tough, clear solid self-extinguishing. |
| 3.0 | 7.0 | ------ | ------ | 0.020 | Do. |
| 1.0 | ------ | 9.0 | ------ | 0.25 | Hard, tough, clear solid. |
| 1.5 | ------ | 8.5 | ------ | 0.25 | Do. |
| 2.0 | ------ | 8.0 | ------ | 0.25 | Hard, tough, clear solid self-extinguishing. |
| 2.5 | ------ | 7.5 | ------ | 0.25 | Do. |
| 3.0 | ------ | 7.0 | ------ | 0.25 | Do. |
| 1.0 | ------ | ------ | 9.0 | 0.05 | Hard, tough, clear solid. |
| 1.5 | ------ | ------ | 8.5 | 0.05 | Do. |
| 2.0 | ------ | ------ | 8.0 | 0.05 | Do. |
| 2.5 | ------ | ------ | 7.5 | 0.05 | Hard, tough, clear solid self-extinguishing. |
| 3.0 | ------ | ------ | 7.0 | 0.05 | Do. |

EXAMPLE 5

*Diallyl beta-carboxymethyl propanephosphonate*

300.3 grams (3 moles) of methyl methacrylate and 486.3 grams (3 moles) of diallyl phosphite were placed in a one liter flask fitted with stirrer, thermometer and dropping funnel. A sodium allylate catalyst solution, prepared by dissolving sodium in a mixture of allyl alcohol and toluene, was added dropwise at such rate that the reaction temperature was maintained between 30° and 45° C. with intermittent cooling in a water bath. The reaction took 131 minutes. The mixture was stirred for another 30 minutes and 400 grams of a 5% NaHCO₃ solution added, and the mixture stirred for 30 minutes at 65°–70° C. After standing the mixture separated into layers. The aqueous layer was discarded and the organic layer stripped of volatiles to 100° C. at 1 mm. and filtered.

767.9 grams (97.6% yield) of a water-white liquid diallyl beta-carboxymethyl propanephosphonate were recovered. The product had an index of refraction $N_D^{25}=1.4570$, a density $d_{25}^{25}=1.105$ g./ml., and acidity=0.002 ml. of 0.1 N NaOH/gram. It had a phosphorus content of 11.5% compared to the calculated value of 11.8%.

Polymerization of a 5 gram sample with 3% benzoyl peroxide for 16 hours at 85° C. gave a hard, tough, water-white, self-extinguishing resin.

The monomeric diallyl, beta-carboxymethyl propanephosphonate ester is completely miscible with carbon tetrachloride, chloroform, ethylene dichloride, hexane, toluene, benzene, diethyl ether, methanol, butanol, and ethyl acetate, etc. and, therefore, may be easily formulated in various coating compositions.

EXAMPLE 7

*Diallyl beta-carboxyethyl ethanephosphonate*

100.1 gms. (1.0 mole) of ethyl acrylate and 162.1 gms. of redistilled diallyl phosphite were stirred in a reaction flask while adding, dropwise, a catalyst solution of sodium allylate at such rate as to maintain, with cooling, a reaction temperature of about 20 to 40° C. One hundred and fifteen minutes were required to complete the reaction while an equivalent of 0.22 gms. sodium were used. 5 ml. of water was added and the reaction mixture saturated with CO₂ gas. The volatiles were then distilled off at 115° C. (3 mm.) and the residual liquid filtered. 253.6 gms. (96.6% yield) of water-white diallyl beta-carboxyethyl ethanephosphonate were recovered having an index of refraction of $N_D^{25}=1.4549$. Polymerization of a 5 gm. sample at 87° C. for 16 hours gave a yellow rosin-like solid.

EXAMPLE 8

*Diallyl beta-carboxyethyl propanephosphonate*

114.1 gms. (1.0 mole) of ethyl methacrylate (stabilized with 0.006% hydroquinone) and 162.1 gms. (1.0 mole) of diallyl phosphite were reacted in a manner similar to the above procedure at a temperature of 20–25° C. After completion of the reaction the volatiles were stripped off at 110° C. (1 mm.) and the mixture filtered. 261.6 gms. (94.8% yield) of water-white diallyl beta-carboxyethyl propanephosphonate having an index of refraction $N_D^{25}=1.4530$ were recovered. Polymerization tests with 3% benzoyl peroxide for 16 hours at 87° C. yielded a clear, tough, pliable solid.

On redistillation at a vapor temperature of 110–113° C. 226.0 gms. (86.5% yield) of the refined ester product was obtained, having an index of refraction $N_D^{25}=1.4529$.

EXAMPLE 9

Dimethallyl beta-carboxymethyl propanephosphonate 75 grams (.75 mole) of methyl methacrylate and 142.5 grams (.75 mole) of dimethallyl phosphite were placed in a reaction flask fitted with stirrer, thermometer and dropping funnel. A sodium methallylate catalyst solution, prepared by dissolving sodium in a mixture of methallyl alcohol and toluene, was added dropwise at such rate that the reaction temperature was maintained between 30° and 45° C. with intermittent cooling in a water bath. The reaction took 123 minutes. 3 ml. of water were added and the reaction mixture saturated with $CO_2$ gas for 10 minutes. Volatiles were stripped out to 100° C. at 1 mm. pressure and the product filtered.

212.9 grams (97.7% yield) of crude product were recovered. This was distilled into fractions. The first fraction having an index of refraction $N_D^{25}=1.4557$ was discarded and the remainder stirred with 100 grams of 10% $NaHCO_3$ solution for one hour at 65–70° C. The aqueous layer was discarded and the organic layer stripped of volatiles to 100° C. at 1 mm. pressure. After filtration 178.4 grams of dimethallyl beta-carboxymethyl propanephosphonate were recovered. The product had an index of refraction $N_D^{25}=1.4582$, a density of $d_{25}=1.070$, and an acidity of 0.05 ml. of 0.1 N NaOH/gram. It had a phosphorus content of 10.4% compared to the calculated value of 10.7%.

Polymerization of a 5 gram sample with 3% benzoyl peroxide for 16 hours at 85° C. gave a hard, tough, water-white resin.

The monomeric esters of this invention may be used for coating fabrics, and other articles and subsequently polymerized to form hard, tough coatings. Also, these esters may be partially polymerized and the prepolymers employed for coating or molding purposes where a viscous material is more readily handled than the more liquid monomeric esters. For example, 300 gms. of liquid diallyl beta-carboxymethyl propanephosphonate ester was heated for three hours at 100° C. with 0.2% benzoyl peroxide. Then after distilling off 117.8 gms. of the ester the residual liquid had a viscosity of 412 centipoises. On further distillation of 30 gms. at 125° C. (½ mm. pressure) the residual partial polymer was a viscous liquid having a viscosity of 5000 centipoises.

The above prepolymer was found to polymerize to a hard, tough, solid resin when heated at 95° C. for 30 minutes, 95–135° C. over 30 minutes and 135° C. for 90 minutes in the presence of 1% benzoyl peroxide, or 1% tertiary butyl perbenzoate.

Under suitable conditions, the monomeric esters disclosed hereinabove may be copolymerized with known polymerizable unsaturated compounds such as vinyl acetate, diallyl phthalate, diallyl benzenephosphonate, methyl methacrylate, methyl acrylate, styrene, unsaturated polyesters, acrylonitrile, and the like to produce useful resin products having flame resistant characteristics.

The copolymerization with other polymerizable compounds of the new dialkenyl beta-carboxyalkyl alkanephosphonates may be carried out by heating mixtures in the presence of a polymerization catalyst such as the organic peroxy compounds, e. g., benzoyl peroxide, acetyl peroxide, tertiary-butyl perbenzoate, etc. The copolymerization may be carried out with mixtures of the monomers in bulk, in a solvent solution, or in an emulsion system. The degree of polymerization may be controlled to produce hard, tough, solid resins, gels and viscous liquid partially polymerized products by controlling the period of heating, temperature, and amount of polymerization catalyst employed.

The partial polymers, resulting from the interruption of the polymerization procedure, being fusible and soluble in organic solvents are suitable for use in coating and impregnating solutions for fabrics, etc. where further polymerization will produce desirable, insoluble and infusible, coatings having flame resistant character.

The following examples illustrate several typical copolymers of the present invention.

EXAMPLE 10

Diallyl beta-carboxymethyl propanephosphonate (produced in Example 2, above) having an index of refraction $N_D^{25}=1.4570$ and a phosphorus content of 11.5%, was mixed with methyl methacrylate and a small amount of benzoyl peroxide and the mixture heated in a glass container for 16 hours at 85° C. The hard, tough, water-white solid resin products obtained using various proportions of the monomers are shown in Table II, together with the results of flammability tests made on the various copolymers.

The flammability test was made by burning an irregular piece of the copolymer (approx. ¼" in diameter) for 15 seconds in a 1½" blue flame, then removing the flame and determining the time required for the resin to stop burning. The time reported in the table is the maximum obtained in three trials. A burning time of less than 15 seconds is considered illustrative of the self-flame-extinguishing character of the resin.

TABLE II

| Percent diallyl beta-carboxymethyl propanephosphonate | Percent methyl methacrylate | Percent benzoyl peroxide | Character of resin | Burning time (seconds) |
|---|---|---|---|---|
| 15 | 85 | 0.16 | Water-white, hard tough solid. | 15 |
| 20 | 80 | .18 | -----do----------------- | 3 |
| 25 | 75 | .20 | -----do----------------- | 2 |
| 30 | 70 | .22 | -----do----------------- | 2 |
| 35 | 65 | .25 | -----do----------------- | 2 |
| 50 | 50 | .50 | -----do----------------- | 1 |
| 70 | 30 | 1.20 | -----do----------------- | <1 |
| 90 | 10 | 2.50 | -----do----------------- | <1 |

Note.—> indicates greater than; < indicates less than.

In a similar manner, Table III illustrates the characteristics of copolymers of diallyl beta-carboxymethyl propanephosphonate and diallyl phthalate, following the same procedure as in the above example.

Table IV illustrates copolymers with "Laminac 4201" (an unsaturated polyester type partial polymer produced by the American Cyanamid Company).

In a similar manner, Table V illustrates copolymers with vinyl acetate with the polymerizing procedure modified to the extent of heating at 70° C. for 16 hours, and at 85° C. for 24 hours.

TABLE III

| Percent diallyl beta-carboxymethyl propanephosphonate | Percent diallyl phthalate | Percent benzoyl peroxide | Character of resin | Burning time (seconds) |
|---|---|---|---|---|
| 10 | 90 | 2.5 | Clear, gold yellow, hard and tough. | >15 |
| 15 | 85 | 2.5 | Clear, light yellow, hard and tough. | 6 |
| 20 | 80 | 2.5 | -----do----------------- | 1 |
| 25 | 75 | 2.5 | -----do----------------- | <1 |
| 30 | 70 | 2.5 | -----do----------------- | <1 |
| 35 | 65 | 2.5 | -----do----------------- | <1 |
| 50 | 50 | 2.6 | -----do----------------- | 1 |
| 70 | 30 | 2.7 | -----do----------------- | 1 |
| 90 | 10 | 2.8 | -----do----------------- | <1 |

TABLE IV

| Percent diallyl beta-carboxymethyl propanephosphonate | Percent unsaturated polyester | Percent benzoyl peroxide | Character of resin | Burning time (seconds) |
|---|---|---|---|---|
| 15 | 85 | 0.5 | Clear, light yellow, hard and tough. | >15 |
| 20 | 80 | .6 | -----do----- | 4 |
| 25 | 75 | .7 | -----do----- | 2 |
| 30 | 70 | .8 | Clear, straw color, hard and tough. | 2 |
| 35 | 65 | 1.0 | -----do----- | 2 |
| 50 | 50 | 1.5 | Clear, light straw color, hard and tough. | 1 |
| 70 | 30 | 2.0 | Clear, water white, hard and tough. | <1 |

TABLE V

| Percent diallyl beta-carboxymethyl propanephosphonate | Percent vinyl acetate | Percent benzoyl peroxide | Character of resin | Burning time (seconds) |
|---|---|---|---|---|
| 10 | 90 | 0.2 | Colorless, sl. hazy, hard and tough. | 2 |
| 15 | 85 | 0.3 | -----do----- | 5 |
| 20 | 80 | 0.5 | -----do----- | 2 |
| 25 | 75 | 0.6 | -----do----- | 2 |
| 30 | 70 | 0.8 | -----do----- | 2 |
| 35 | 65 | 0.9 | -----do----- | 1 |
| 50 | 50 | 1.5 | -----do----- | 1 |
| 70 | 30 | 2.0 | -----do----- | <1 |

EXAMPLE 11

Dimethallyl beta-carboxymethyl propanephosphonate (prepared in accordance with Example 9, above) having an index of refraction $N_D^{25} = 1.4582$, a phosphorus content of 10.4% and acidity of 0.05 ml. of 0.1 N NaOH/gram was copolymerized with methyl methacrylate, diallyl phthalate, unsaturated polyester, and vinyl acetate, in the manner described in Example 10. The resulting copolymers had the physical and flammability characteristics shown in Tables VI, VII, VIII, and IX. Similar properties for copolymers with styrene are shown in Table X. Here the heating conditions to effect copolymerization were 24 hours at 70° C., 40 hours at 78° C., and 7 hours at 85° C.

TABLE VI

| Percent dimethallyl beta-carboxymethyl propanephosphonate | Percent methyl methacrylate | Percent benzoyl peroxide | Character of resin | Burning time (seconds) |
|---|---|---|---|---|
| 15 | 85 | 0.12 | Colorless, sl. hazy, hard and tough. | >15 |
| 20 | 80 | .16 | -----do----- | >15 |
| 25 | 75 | .18 | -----do----- | >15 |
| 30 | 70 | .22 | -----do----- | 6 |
| 35 | 65 | .25 | Water white, hard and tough. | 2 |
| 50 | 50 | .50 | -----do----- | 2 |
| 70 | 30 | 1.20 | -----do----- | 2 |
| 90 | 10 | 2.50 | -----do----- | <1 |

TABLE VII

| Percent dimethallyl beta-carboxymethyl propanephosphonate | Percent diallyl phthalate | Percent benzoyl peroxide | Character of resin | Burning time (seconds) |
|---|---|---|---|---|
| 15 | 85 | 2.8 | Clear, yellow, hard and tough. | >15 |
| 20 | 80 | 2.5 | -----do----- | 2 |
| 25 | 75 | 2.5 | -----do----- | 2 |
| 30 | 70 | 2.5 | -----do----- | 2 |
| 35 | 65 | 2.5 | Clear, light yellow, hard and tough. | 1 |
| 50 | 50 | 2.6 | -----do----- | <1 |
| 70 | 30 | 2.7 | -----do----- | 1 |

TABLE VIII

| Percent dimethallyl beta-carboxymethyl propanephosphonate | Percent unsaturated polyester | Percent benzoyl peroxide | Character of resin | Burning time (seconds) |
|---|---|---|---|---|
| 15 | 85 | 0.5 | Clear, slight yellow, hard and tough. | >15 |
| 20 | 80 | .6 | -----do----- | 7 |
| 25 | 75 | .7 | -----do----- | 7 |
| 30 | 70 | .8 | -----do----- | 5 |
| 35 | 65 | 1.0 | -----do----- | 3 |
| 50 | 50 | 2.0 | -----do----- | 1 |
| 70 | 30 | 2.5 | -----do----- | 2 |

TABLE IX

| Percent dimethallyl beta-carboxymethyl propanephosphonate | Percent vinyl acetate | Percent benzoyl peroxide | Character of resin | Burning time (seconds) |
|---|---|---|---|---|
| 15 | 85 | 0.3 | Colorless, sl. hazy, hard and tough. | 2 |
| 20 | 80 | .5 | -----do----- | 3 |
| 25 | 75 | .6 | -----do----- | 3 |
| 30 | 70 | .8 | Colorless, v. sl. hazy, hard and tough. | <1 |
| 35 | 65 | .9 | -----do----- | <1 |
| 50 | 50 | 1.5 | Water white, clear, hard and tough. | <1 |
| 70 | 30 | 2.0 | -----do----- | 1 |

TABLE X

| Diallyl beta-carboxymethyl propanephosphonate, grams | Styrene, grams | Benzoyl peroxide, grams | Character of resin | Burning time (seconds) |
|---|---|---|---|---|
| 9.0 | 1.0 | 0.10 | Hard, tough, sl. hazy, colorless. | >15 |
| 8.5 | 1.5 | .12 | -----do----- | 8 |
| 8.0 | 2.0 | .14 | -----do----- | >15 |
| 7.5 | 2.5 | .16 | Hard, tough, hazy, colorless. | 7 |
| 7.0 | 3.0 | .18 | -----do----- | 5 |
| 6.5 | 3.5 | .20 | -----do----- | 2 |
| 5.0 | 5.0 | .25 | Hard, tough, translucent, colorless. | <1 |
| 3.0 | 7.0 | .30 | -----do----- | 1 |
| 1.0 | 9.0 | .30 | Hard, tough, clear, colorless. | <1 |

It may also be stated that none of the copolymers of the present invention are thermoplastic in spite of the fact that as much as 90% of a polymerizable compound, which normally forms a thermoplastic resin, is employed in our new copolymers.

The above tabulated results shown the unusual ability of the new alkanephosphonate esters in contributing flame-resistance to the copolymer compositions.

Products and procedures in imparting flame-resistance by the use of the compounds described herein are described and claimed in the copending applications of A. D. F. Toy and R. S. Cooper, Serial No. 381,760, filed September 22, 1953, and T. P. Traise and J. R. Costello, Jr., Serial No. 381,763, filed September 22, 1953.

The foregoing detailed description has been given for clearness of understanding only and no unnecessary limitations should be understood therefrom as modifications will be obvious to those skilled in the art.

We claim:

1. A polymer consisting essentially of a completely polymerized di beta, gamma alkenyl beta (carboxyalkyl) alkanephosphonate of the formula

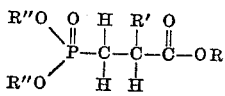

wherein R is a member of the class consisting of methyl and ethyl radicals, R' is a member of the class consisting of hydrogen and methyl radicals, and R" is a beta, gamma unsaturated alkenyl radical of the class consisting of allyl and methallyl radicals.

2. A partial polymer consisting essentially of a partially polymerized di beta, gamma alkenyl beta (carboxyalkyl) alkanephosphonate of the formula

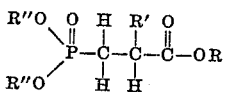

wherein R is a member of the class consisting of methyl and ethyl radicals, R' is a member of the class consisting of hydrogen and methyl radicals, and R" is a beta, gamma unsaturated alkenyl radical of the class consisting of allyl and methallyl radicals.

3. A copolymer of 10–90% by weight of a di beta, gamma alkenyl beta (carboxyalkyl) alkanephosphonate of the formula

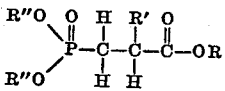

wherein R is a member of the class consisting of methyl and ethyl radicals, R' is a member of the class consisting of hydrogen and methyl radicals, and R" is a beta, gamma unsaturated alkenyl radical of the class consisting of allyl and methallyl radicals 90–10% by weight of a polymerizable compound of the class consisting of methyl methacrylate, methyl acrylate, diallyl phthalate, vinyl acetate, styrene and unsaturated polyester resins.

4. The copolymer of claim 3 wherein the phosphonate is diallyl beta-carboxymethyl propanephosphonate.

5. A copolymer of 20–90% by weight of diallyl beta-carboxymethyl propanephosphonate and 80–10% of methyl methacrylate.

6. A copolymer of 10–90% by weight of diallyl beta-carboxymethyl propanephosphonate and 90–10% of diallyl phthalate.

7. A copolymer of 10–90% by weight of diallyl beta-carboxymethyl propanephosphonate and 90–10% of vinyl acetate.

8. A copolymer of 10–90% by weight of dimethallyl beta-carboxymethyl propanephosphonate and 90–10% of vinyl acetate.

9. A copolymer of a di beta, gamma alkenyl beta (carboxyalkyl) alkanephosphonate of the formula

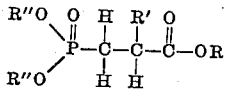

wherein R is a member of the class consisting of methyl and ethyl radicals, R' is a member of the class consisting of hydrogen and methyl radicals, and R" is a beta, gamma, unsaturated alkenyl radical of the class consisting of allyl and methallyl radicals and a different ethylenically unsaturated monomer co-polymerizable therewith.

10. The copolymer of claim 9 where in the phosphonate and the polymerizable ethylenically unsaturated monomer are within the ratios of 10 to 90 and 90 to 10, respectively, per total of 100 parts, by weight.

References Cited in the file of this patent

UNITED STATES PATENTS

| | | |
|---|---|---|
| 2,559,854 | Dickey et al. | July 10, 1951 |
| 2,601,520 | Harman et al. | June 24, 1952 |
| 2,668,800 | Johnston | Feb. 9, 1954 |
| 2,714,100 | Fon Toy et al. | July 26, 1955 |

FOREIGN PATENTS

| | | |
|---|---|---|
| 660,169 | Great Britain | Oct. 31, 1951 |

OTHER REFERENCES

Chemical Abstracts, vol. 45, column 8970, Oct. 25, 1951.

Chemical Abstracts, vol. 48, col. 7540e, abstracted from article by Kamai et al., Doklady Akad Nauk SSSR, 89, 309–12, Jan. 16, 1953. (Copy in NIH Library.)